United States Patent
Hilton

(10) Patent No.: US 7,680,747 B2
(45) Date of Patent: *Mar. 16, 2010

(54) CASH GENERATION FROM PORTFOLIO DISPOSITION USING MULTI OBJECTIVE GENETIC ALGORITHMS

(75) Inventor: Kenneth W. Hilton, Half Moon Bay, CA (US)

(73) Assignee: Intuit Inc., Mountain View, CA (US)

( * ) Notice: Subject to any disclaimer, the term of this patent is extended or adjusted under 35 U.S.C. 154(b) by 1992 days.

This patent is subject to a terminal disclaimer.

(21) Appl. No.: 10/099,043

(22) Filed: Mar. 14, 2002

(65) Prior Publication Data

US 2004/0128219 A1 Jul. 1, 2004

(51) Int. Cl.
*G06N 3/12* (2006.01)

(52) U.S. Cl. .......................... 706/13; 706/45
(58) Field of Classification Search ............. 706/13, 706/45

See application file for complete search history.

(56) References Cited

U.S. PATENT DOCUMENTS

| | | | |
|---|---|---|---|
| 5,126,936 A | 6/1992 | Champion et al. | |
| 5,255,345 A | 10/1993 | Shaefer | |
| 5,644,727 A | 7/1997 | Atkins | |
| 5,761,442 A | 6/1998 | Barr et al. | |
| 5,845,266 A | 12/1998 | Lupien et al. | |
| 5,852,811 A | 12/1998 | Atkins | |
| 5,875,437 A | 2/1999 | Atkins | |
| 5,999,918 A | 12/1999 | Wililams et al. | |
| 6,012,046 A | 1/2000 | Lupien et al. | |
| 6,055,517 A | 4/2000 | Friend et al. | |
| 6,078,904 A | 6/2000 | Rebane | |
| 6,098,051 A | 8/2000 | Lupien et al. | |
| 6,188,992 B1 | 2/2001 | French | |
| 6,240,399 B1 * | 5/2001 | Frank et al. ............... | 705/36 R |
| 6,393,409 B2 | 5/2002 | Young et al. | |
| 6,405,179 B1 | 6/2002 | Rebane | |
| 6,484,152 B1 | 11/2002 | Robinson | |
| 6,601,044 B1 | 7/2003 | Wallman | |
| 6,606,615 B1 | 8/2003 | Jennings et al. | |

(Continued)

FOREIGN PATENT DOCUMENTS

WO    WO 96/18162    6/1996

(Continued)

OTHER PUBLICATIONS

"Genetic Algorithms", author unknown, url = http://neo.lcc.uma.es/TutorialEA/semEC/cap02/cap_2.html.*

(Continued)

*Primary Examiner*—David R Vincent
*Assistant Examiner*—Lut Wong
(74) *Attorney, Agent, or Firm*—Osha • Liang LLP

(57) ABSTRACT

A plan for disposing of assets in a given asset portfolio is determined using a genetic algorithm, which operates to satisfy certain objectives, including the generation of a cash amount. A genome population including a number of vectors is generated. The genome population is modified using a genetic algorithm, until at least one vector represents a change in the percentage of each asset such that the disposition of each asset in accordance with the vector most nearly satisfies one or more objectives.

26 Claims, 3 Drawing Sheets

U.S. PATENT DOCUMENTS

| | | | | |
|---|---|---|---|---|
| 6,957,200 | B2* | 10/2005 | Buczak et al. | 706/13 |
| 7,124,105 | B2* | 10/2006 | Hilton | 705/35 |
| 7,444,309 | B2* | 10/2008 | Branke et al. | 706/13 |
| 2001/0034662 | A1 | 10/2001 | Morris | |
| 2002/0013754 | A1 | 1/2002 | Frank et al. | |
| 2002/0091605 | A1 | 7/2002 | Labe, Jr. et al. | |
| 2003/0088492 | A1 | 5/2003 | Damschroder | |
| 2003/0233304 | A1 | 12/2003 | Dhurandhar et al. | |
| 2004/0030622 | A1 | 2/2004 | Ramos et al. | |

FOREIGN PATENT DOCUMENTS

| | | |
|---|---|---|
| WO | WO 98/44443 | 10/1998 |
| WO | WO 98/44444 | 10/1998 |
| WO | WO 00/38094 | 6/2000 |
| WO | WO 00/39734 | 7/2000 |
| WO | WO 03/017683 A2 | 2/2003 |

OTHER PUBLICATIONS

Yiu-Wing Leung, Yuping Wang "Multiobjective programming using uniform design and genetic algorithm" IEEE transactions on system, man, and cybernetics, part C: applications and reviews, vol. 30, No. 3, Aug. 2000.*

William Raynor "The internation dictionary of artificial intelligence" 1999. only cover, and p. 278.*

Chen, Shu-Heng et al., "Option Pricing with Genetic Algorithms: The Case of European-Style Options," Proceedings of the Seventh International Conference on Genetic Algorithms, Michigan State University (Jul. 19-23, 1997), pp. 704-711.

Kallel, Leila et al., "Alternative Random Initialization in Genetic Algorithms," Proceedings of the Seventh International Conference on Genetic Algorithms, Michigan State University (Jul. 19-23, 1997), pp. 268-275.

Tsutsui, Shigeyoshi et al., "A Real Coded Genetic Algorithm with an Explorer and an Exploiter Populations," Proceedings of the Seventh International Conference on Genetic Algorithms, Michigan State University (Jul. 19-23, 1997), pp. 238-245.

Wall, Matthew, "Overview of Genetic Algorithms," MIT Mechanical Engineering Department presentation on Introduction to Genetic Algorithms [online], date unknown [retrieved on Nov. 8, 2001]. Retrieved from the Internet: <ULR: http://lancet.mit.edu/~mbwall/presentations/IntroToGAs/P001.html>.

Cacho, Oscar et al., "A Genetic Algorithm Approach To Farm Investment," The Australian Journal of Agricultural and Resource Economics (Sept 1999), vol. 43, Issue 3, pp. 305-322.

Mehta, Kumar et al., "Combined Rules Learnt Using Genetic Algorithms for Financial Forecasting," Proceedings of the Congress on Evolutionary Computation (CEC), Washington D.C. [online], Jun. 1999 [retrieved on May 30, 2002]. Retrieved from the Internet: <ULR: http://icarus.cc.uic.edu/~kmehta1/CEC99.pdf>.

Mansini, Renata et al., "Heuristic Algorithms for the Portfolio Selection Problem With Minimum Transaction Lots," European Journal of Operational Research 114 (1999), pp. 219-233.

Gilli, Manfred et al., "Heuristic Approaches for Portfolio Optimization," Computing in Economics and Finance 2000 [online], Jul. 5, 2000, [retrieved on May 30, 2002]. Retrieved from the Internet: <URL: http/fmwww.bc.edu/cef00/papers/paper289.pdf>.

Neuneier, Ralph, "Optimal Asset Allocation Using Adaptive Dynamic Programming," Advances in Neural Information Processing Systems (1996), vol. 8, pp. 952-958.

Alander, Jarmo T., "An Indexed Bibliography of Genetic Algorithms in Economics," drafted May 18, 2000, Department of Information Technology and Production Economics, University of Vaasa, Report Series No. 94-1-ECO.

Bao, Paul et al, "A Hybrid Portfolio Theory Model Based on Genetic Algorithm and Vector Quantization," Oct. 1998, 1998 Proceedings of IEEE Conference on Systems, Man and Cybernetics, San Diego, California, pp. 4301-4306.

Bedau, Mark A., et al, "Visualizing Waves of Evolutionary Activity of Alleles," Jul. 13, 1999, Proceedings of the 1999 Genetic and Evolutionary Computation Conference Workshop Program, Orlando, Florida, pp. 96-98.

Butler, James M., et al, "Eddie Beats the Bookies," Dec. 15, 1995, Wiley InterScience Software—Practice & Experience, vol. 28, Issue 10 (Aug. 1998), pp. 1033-1043.

Chan, Man-Chung et al, "Genetic Algorithms in Multi-Stage Asset Allocation System," Oct. 2002, 2002 Proceedings of IEEE International Conference on System, Man and Cybernetics, vol. 3, pp. 316-321.

Chen, Shu-Heng, "Evolutionary Computation in Financial Engineering: A Roadmap of GAs and GP," date unknown, Financial Engineering News, vol. 2, No. 4 (Sep. 1998), 10 pages.

Chen, Shu-Heng, "On the Relevance of Genetic Programming to Evolutionary Economics," 2001, Evolutionary Controversy in Economics Towards a New Method in Preference of Trans Discipline, Springer-Verlag, Tokyo, pp. 135-150.

Dempster, M. et al, "A Real-Time Adaptive Trading System Using Genetic Programming," 2001, Quantitative Finance vol. 1, Institute of Physics Publishing, pp. 397-413.

Dhar, Vasant et al, Abstract of "Data Mining and Knowledge Discovery" (online), Oct. 2000, Kluwer Journals [retrieved on Mar. 26, 2004]. Retrieved from the Internet: <URL: http://ipsapp007.kluweronline.com/IPS/content/ext/x/J/4441/I/15/A/1/abstract.htm>.

Dunis, Christian L. et al, Abstract of "Forecasting and Trading Currently Volatility: An Application of Recurrent Neural Regression and Model Combination" (online), Jun. 2002, Wiley InterScience Journal of Forecasting [retrieved on Mar. 28, 2005]. Retrieved from the Internet: <URL: http://www3.interscience.wiley.com/cgi-bin/abstract/94516945/ABSTRACT>.

Foster, James A. et al, "Portfolio Selection with Genetic Algorithms," Apr. 4, 1996, University of Idaho, Department of Computer Science Laboratory for Applied Logic, 13 pages.

Frick, Andreas, et al, "A Genetic-Based Approach for the Derivation of Trading Strategies on the German Stock Market," 1996, Proceedings of $3^{rd}$ International Conference on Neural Information Processing, Hong Kong (Sep. 24-27, 1996), pp. 776-770.

Frick, Andreas, et al, "Genetic-Based Trading Rules—A New Tool to Beat the Market With?," 1996, Proceedings of $6^{th}$ International AFIR Colloquium, Nürnberg (Oct. 1-3, 1996), vol. I/II, pp. 997-1018.

Iba, Hitoshi et al., "Using Genetic Programming to Predict Financial Data," Sep. 1999, Proceedings of the Congress on Evolutionary Computation, vol. 1, pp. 244-251.

Jiang, Rui et al, "Discovering Investment Strategies in Portfolio Management: A Genetic Algorithm Approach," Proceedings of the $9^{th}$ International Conference on Neural Information Processing (Nov. 18-22, 2002), vol. 3, pp. 1206-1210.

Kai, Fu et al, "Training Neural Network with Genetic Algorithms for Forecasting the Stock Price Index," 1997, Proceedings of IEEE International Conference on Intelligent Processing Systems (Oct. 28-31, 1997), vol. 1, pp. 401-403.

Korczak, J. et al, Abstract of "Stock Timing Using Genetic Algorithms"(online), May 21, 2002, Wiley InterScience Applied Stochastic Models in Business and Industry (retrieved on Mar. 28, 2005). Retrieved from the Internet: <URL: http://www3.interscience.wiley.com/cgi-bin/abstract/93521062/ABSTRACT>.

Koza, John R., "Genetic Programming," Version 2 submitted Aug. 18, 1997, Encyclopedia of Science and Technology.

Lam, Kin et al, Abstract of "Forecasting for the Generation of Trading Signals in Financial Markets" (online), Jan. 18, 2000, Wiley InterScience Journal of Forecasting [retrieved on Mar. 28, 2005]. Retrieved from the Internet: <URL: http://www3.interscience.wiley.com/cgi-bin/abstract/69500089/ABSTRACT>.

Leinweber, David J., "The Perils and Promise of Evolutionary Computation on Wall Street" (online), 2003, Journal of Investing, vol. 12, No. 13 [retrieved on Mar. 26, 2004]. Retrieved from the Internet: <URL: http://64.233.167.104/search?q=cache:g1ghdtvD7McJ:www.iijournals.com/common/getArticlePDF.asp%3FArticleID%3D1860...>.

Li, Jin et al, "Improving Technical Analysis Predictions: An Application of Genetic Programming," 1999, Proceedings, Florida Artificial Intelligence Research Symposium, Orlando, FL (1999), 13 pages.

Li, Jin et al, "Investment Decision Making Using FGP: A Case Study,"1999 IEEE Proceedings of the Congress on Evolutionary Computation, Washington, D.C. (Jul. 6-9, 1999), pp. 1253-1259.

Liao, Pen-Yang et al., "Dynamic Trading Strategy Learning Model Using Learning Classifier Systems," 2001, Proceedings of IEEE Congress on Evolutionary Computation, vol. 2, pp. 783-789.

Lin, Wen-Shiu et al., "A Study on Investment Decision Making Model: Genetic Algorithms Approach," 1999, Proceedings of IEEE International Conference on System, Man and Cybernetics (Oct. 12-15, 1999), vol. 1, pp. 1049-1054.

Mahfoud, Sam et al, "Financial Forecasting Using Genetic Algorithms," 1996, Journal of Applied Artificial Intelligence, vol. 10, No. 6, pp. 543-565.

Markose, Sheri et al., "Evolutionary Arbitrage for FTSE-100 Index Options and Futures," 2001, Proceedings of IEEE Congress on Evolutionary Computation, Seoul, So. Korea (May 20-27, 2001), vol. 1, pp. 275-282.

Nag, Ashok K. et al, Abstract of "Forecasting Daily Foreign Exchange Rates Using Genetically Optimized Neural Networks" (online), Jul. 12, 2002, Wiley InterScience Journal of Forecasting [retrieved on Mar. 28, 2005]. Retrieved from the Internet: <URL: http://www3.interscience.wiley.com/cgi-bin/abstract/96516078/ABSTRACT>.

Neeley, Christopher, et al, "Is Technical Analysis in the Foreign Exchange Market Profitable? A Genetic Programming Approach," Dec. 1997, Journal of Financial and Quantitative Analysis, Working Paper 1996-006C for the Federal Reserve Bank of St. Louis.

O'Neill, Michael, et al, "Evolving Market Index Trading Rules Using Grammatical Evolution," 2001, In EvoWorkshops, pp. 343-352.

Orito, Yukiko et al, "Index Fund Portfolio Selection by Using GA," 2001, Proceedings of IEEE International Conference on Computational Intelligence and Multimedia Applications (Oct. 30 to Nov. 1, 2001), pp. 118-122.

Schlottmann, Frank et al, "A Hybrid Genetic-Quantitative Method for Risk-Return Optimization of Credit Portfolios," 2001, Proceedings of the Conference of Quantitative Methods in Finance, Sydney, Australia, p. 55 (27 pages).

Setzkorn, Christian et al, Evolving Rule-Based Trading Systems, 2002, Department of Computer Science, University of Liverpool, Technical Report ULCS 02-005.

Tang, Jing et al, "Grid Technology in Financial Planning—A Methodology for Portfolio Structuring," date and source unknown.

Tang, Wansheng et al., "Fractional Programming Model for Portfolio with Probability Criterion," 2002 Proceedings of IEEE International Conference on Systems, Man and Cybernetics (Oct. 6-9, 2002), vol. 6, 4 pages.

Vacca, Luigi et al, "Managing Options Risk with Genetic Algorithms," Jan. 30, 1997, Proceedings of IEEE/IAFE Computational Intelligence in Finance Engineering Conference (Mar. 1997), New York, pp. 29-35.

Wang, Jun, Abstract of "Trading and Hedging in S&P 500 Spot and Futures Markets Using Genetic Programming" (online), Nov. 2, 2000, Wiley InterScience Journal of Forecasting [retrieved on Mar. 28, 2005]. Retrieved from the Internet: <URL: http://www3.interscience.wiley.com/cgi-bin/abstract/75000894/ABSTRACT>.

"List of Technical Trading Articles," date and source unknown, 7 pages.

Pacheco, M.A. et al., "Cash Flow Planning and Optimization Through Genetic Algorithms," ICA: Applied Computational Intelligence Laboratory, Departamento de Engenharia Eléctrica, Pontificia Universidade Católica do Rio de Janeiro, 6 pages, date unknown.

Noe, Thomas H. et al. "Corporate Financing: An Artificial Agent-Based Analysis," source unknown (Mar. 2000), pp. 1-47.

Pacheco, Marco Aurélio et al., "Cash Flow Planning and Optimization Through Genetic Algorithms," Computing in Economics and Finance 2000, Society for Computational Economics (2000) No. 333.

Sakanashi, Hidenori et al., "Adaptive Attention Control in Genetic Algorithm," IPSJ Journal Abstract, vol. 38 No. 07-001 [online], May 24, 2001 [retrieved on Nov. 5, 2002]. Retrieved from the Internet: <ULR: http://www.ipsj.or.jp/members//Journal/Eng/3807/article001.html>.

* cited by examiner

CASH GENERATION FROM PORTFOLIO DISPOSITION USING MULTI OBJECTIVE GENETIC ALGORITHMS

TECHNICAL FIELD

The present invention relates generally to financial analysis of portfolios for optimized liquidation, and to using genetic algorithms for generating a desired amount of cash from a given asset portfolio while optimizing one or more objectives. The present invention also relates to rebalancing a given asset portfolio while optimizing one or more objectives.

BACKGROUND OF THE INVENTION

Cash. Just the sound of it evokes permanence, substance, an almost tangible feel, a tribute to its origin in the French word for 'money box,' casse. We speak of "cash in hand," "cash on the barrelhead" and "cash cow," all suggesting an unqualified immediacy of value or profit. Cash is the lubricant of finance, the most liquid of assets; if there is anything for which one would say "don't leave home without it," it must be cash. The range of uses of cash is unlimited. But the primary question is this: where do you get cash?

There are basically three ways to obtain cash: 1) working; 2) selling assets; and 3) investing assets. One way of obtaining cash is by selling existing assets from an existing asset portfolio. As shown in FIG. 1, one can sell certain assets from an asset portfolio 100 including assets A, B, C, and D, to obtain a modified asset portfolio 103 including assets A', B', C', and D' and a certain amount of cash. One can use such cash generated to purchase other assets, so as to obtain another modified asset portfolio 105 including assets A", B", C", D", E", and F". These assets A, B, C, D and the like can be any type of assets, such as stock of a particular company, stock of a particular type (large cap, small cap, etc.), real property, bonds, intellectual property, personal property, cash, and even debt or liabilities. For the purposes of the present invention, an 'asset' is anything that can be given an economic value. Conventional investment strategies normally only recommend how an asset portfolio should be redistributed for optimization. This is so called portfolio optimization or portfolio balancing. As shown in FIG. 2, conventional investment strategies typically recommend that, for a given investor, the initial asset portfolio 100 including a plurality of assets, such as A, B, C, and D, should be redistributed to the modified asset portfolio 105 including a plurality of assets, such as A", B", C", D", E", and F". In order for such portfolio optimization to occur, it is inevitable that certain assets in the initial asset portfolio should be sold to generate a certain amount of cash and that the generated cash should be used to purchase new assets for the modified asset portfolio, as shown in FIG. 1. However, the prior art (FIG. 2) only teaches the type and amount of assets that should be included in the modified asset portfolio, but does not teach or suggest how a certain amount of cash should be generated from the initial asset portfolio while satisfying certain objectives in order to reach the modified asset portfolio. In other words, conventional portfolio optimization merely identifies the desired end result, the modified portfolio, but does not describe how to achieve that end result.

One of the key issues that arise in disposing of assets in any context is the tax consequence. While many investment strategies suggest minimizing tax consequences, when it comes to determining which assets to dispose of in which amounts, the complexity of determining the tax effects is typically overwhelming. While investment advisors do have general heuristics or suggestions for considering the tax consequences, these are merely precautionary, and not based on computational analysis of the actual tax consequences of each various possible optimization plans.

It is a very complicated task to find a solution for how an initial asset portfolio should be modified to generate a certain amount of cash while satisfying certain objectives as shown in FIG. 1. Consider, for example, a situation where $4,000 of cash should be generated from an asset portfolio having ten different mutual find holdings each comprising 10 lots that have assets in different capital gain categories under the tax law, while satisfying certain objectives specified by a user. The search space for this situation would involve devising a plan to sell some part of each asset so as to generate a certain amount of cash while satisfying certain objectives. Having ten funds each with ten lots, there will be 100 distinct assets of which some fraction can be sold. Assuming that the assets can be sold between 1% and 100% in 1% increments, just to simplify the calculation, there will be 100 ways to sell each asset. That is, there will be 100 ways to sell 100 distinct assets, resulting in $100^{100}$ combinations of possible solutions. In addition, a variety of objectives should be considered when finding the solution, such as minimizing tax obligations, maximizing capital gains, avoiding sale of certain assets, minimizing associated commissions and fees, minimizing the number of transactions, preference to sell entire asset lots, consideration of future value, consideration of personal preference, etc., with respect to a user-specified importance level for each objective. The solution space for such a situation will be enormous, discontinuous in scope and will typically involve non-linear, non-dimensional, and inter-dependent variables.

Such a complicated problem is very difficult to solve, but once a solution is obtained, it is easy to check the solution. Such problems are called non-deterministic polynomial ("NP") problems, which mean that it is possible to guess the solution by some non-deterministic algorithm and then check the solution, both in polynomial time. NP problems typically can be solved by genetic algorithms. However, so far there has been no attempt to apply a genetic algorithm to finding a solution for generating a certain amount of cash from an asset portfolio while optimizing certain objectives of a user.

SUMMARY OF INVENTION

The present invention solves this problem by generating a plan for disposing of assets in a given asset portfolio by using a genetic algorithm, while satisfying or optimizing certain objectives, including, but not limited to the generation of a desired amount of cash. The generated cash can be used for various purposes including purchasing new assets for portfolio optimization.

In one embodiment, a genome population including a number of vectors (genomes) is generated. Each vector (genome) represents a change in a percentage of each asset in an asset portfolio containing a number of assets. The genome population is modified using a genetic algorithm, including introducing into the genome population new vectors derived from other vectors, including the original or previously existing vectors. The genome population is modified until at least one vector represents a change in the percentage of each asset such that the disposition of each asset in accordance with the percentage change most nearly satisfies or optimizes one or more objectives, such as the generation of a desired amount of cash, minimization of taxes, or the like.

Modifying the genome population can include determining a fitness of each genome (vector) based on one or more objective functions pertaining to the disposition of an asset in the asset portfolio. The objective functions provide a way of measuring the degree to which the disposition of assets in accordance with a genome vector satisfies the various objectives. Various vectors are selected as mating vectors from the first set of vectors based on their fitness, and then combined to obtain a second set of vectors, which are the offspring of the mating vectors. The resulting offspring vectors are preferably mutated, and used to replace selected ones of vectors in the genome population.

The present invention may be embodied in various forms, including computer program products, methods, and systems, special or general purpose computing devices or apparatus, online services or systems, users interfaces, etc.

By employing a genetic algorithm in order to find a solution for optimizing a set of criteria, such as generating a certain amount of cash, in the disposition of an asset portfolio, it is possible to search a potentially intractable solution space for an optimal solution in an acceptable amount of time.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
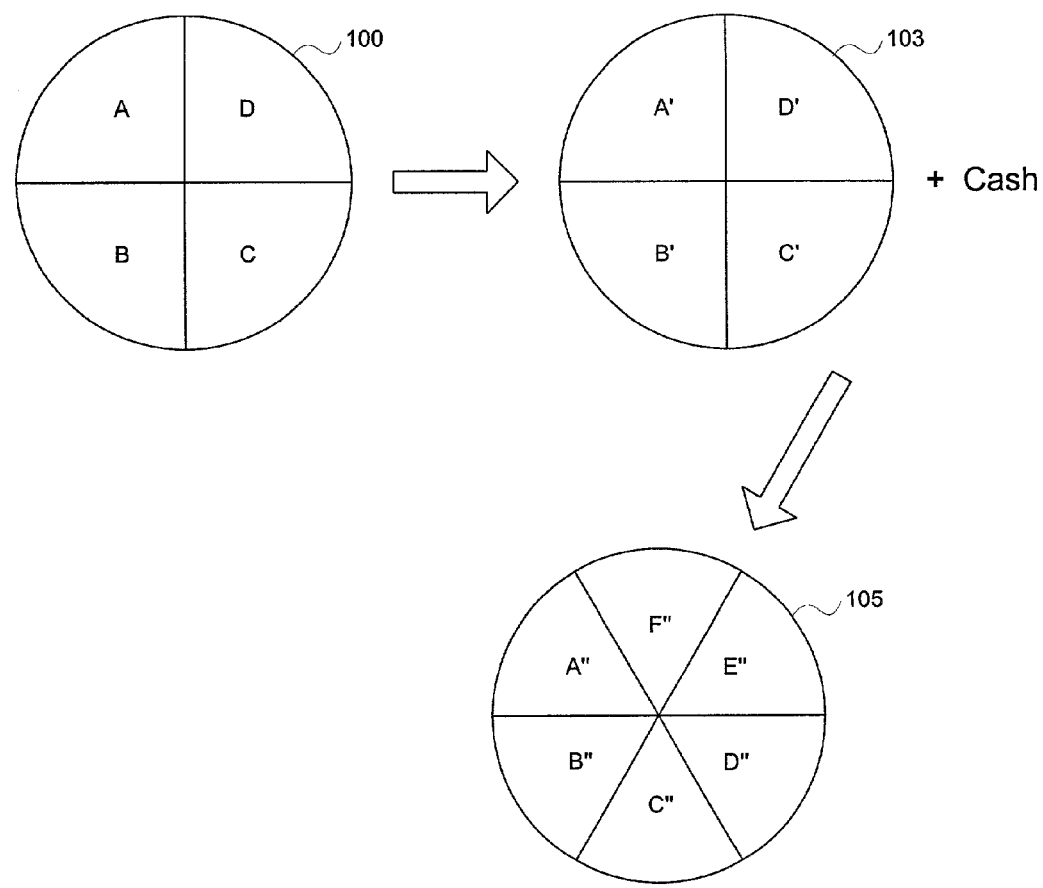
FIG. 1 illustrates how an initial asset portfolio can be changed to an intermediate asset portfolio including cash, and changed again to a modified asset portfolio using the cash generated from the initial asset portfolio.
Figure 2:
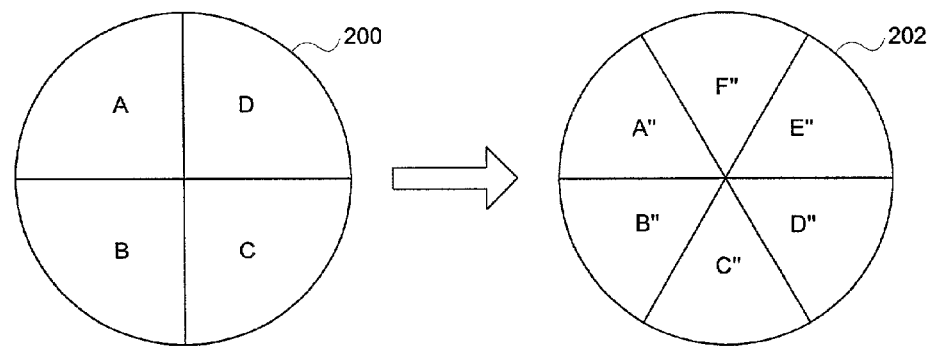
FIG. 2 illustrates a conventional asset portfolio optimization process.
Figure 3:
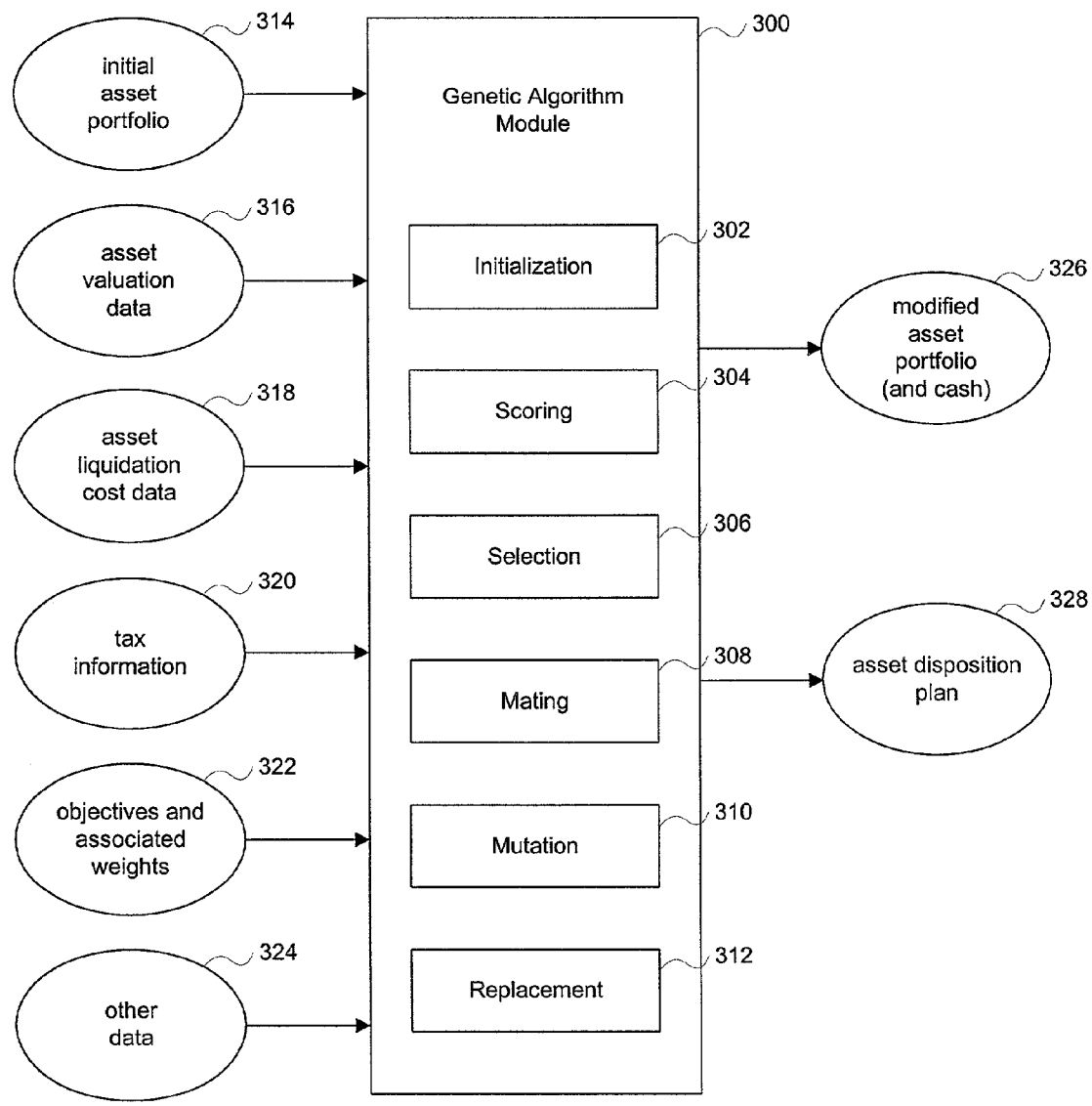
FIG. 3 illustrates the cash generating system of the present invention.

FIG. 3 illustrates the software architecture of a system in accordance with one embodiment of the present invention. A genetic algorithm module 300 searches for an optimum solution for an asset disposition plan that satisfies a number of objectives, such as generating a certain (typically user-specified) amount of cash. The module 300 can also search for an optimum solution for an asset disposition plan for rebalancing an asset portfolio while optimizing various objectives that does not including generating a certain amount of cash. The genetic algorithm module 300 uses as its input data an initial asset portfolio 314, asset valuation data 316, asset liquidation cost data 318, tax information 320, a plurality of objectives 322, and any other type of relevant data 324. Each of these sources of information is stored in appropriate local or remote databases or data stores. Based upon such input data, the genetic algorithm module 300 outputs an asset disposition plan describing a set of transactions 328 for generating the desired amount of cash while satisfying a plurality of objectives, and a resultant modified asset portfolio and cash 326.

The initial asset portfolio 314 can comprise any type of assets, including securities, derivatives, real property, intellectual property, personal property, cash, and even debts or liabilities. It is understood that the initial asset portfolio 314 is not physically present in the present invention, but rather is represented by data used by the module 300. Preferably, each asset in the portfolio 314 has a name, a type, an acquisition date, an acquisition cost, and a current value. Other data may also be associated with the assets, depending upon the implementation and the information deemed desirable to a user, but again, this is not material to the invention. The portfolio 314 may be stored in a conventional relational or flat file database that is accessible to the module 314. For example, many personal finance software applications, such as Intuit Inc.'s QUICKEN® or Microsoft Corp.'s MONEY® use databases to store data pertaining to the user's asset portfolio. It is anticipated that the present invention in its embodiment as the genetic algorithm module 300 may be integrated into a personal finance software application, such as one of the foregoing applications, or integrated into securities trading and management systems which are commonly available online to investors from the many brokerage and securities firms. In this embodiment, the firms store information about a user's portfolio, which can be directly accessed by the module to obtain asset information.

The asset valuation data 316 comprises valuation data for each of the assets included in the initial asset portfolio 314. For example, the asset valuation data 316 can include stock prices for particular companies, stock indexes, mutual fund prices, real property prices, bond prices, valuation of intellectual property such as patents and copyright, etc. The asset valuation data 316 may be provided manually by a user, or it may be obtained automatically by the module 300 via appropriate connections with databases or online information sources. For example, for securities type assets, the module 300 can query conventional stock quotation systems via an Internet network connection, by providing a stock symbol for the security. Again, in an embodiment where the module is part of trading system of a brokerage firm, integration with stock quotation systems will be relatively straightforward. Suffice to say that the manner in which such a connection is made between the module 300 and external databases or system is well understood by those of skill in the art, and the details are not material to the invention.

The asset liquidation cost data 318 comprises cost data for liquidating each of the assets included in the initial asset portfolio 314. The liquidation costs are mostly transaction costs and include, for example, commission for stockbrokers, mutual fund fees, commission for real estate brokers, commission for selling bonds, commission for selling intellectual property rights or personal property, and attorney fees associated with such transactions, etc. Again, this asset liquidation cost data 318 may be stored in a database or table internal to, or accessible by the module 300 via an application programming interface, and may be manually or automatically provided. For example, for securities assets, a commission fee schedule or equation for the sale of securities in accordance with the number of shares, lots, or dollar value may be stored and accessible by the module 300. Here too, integration with a trading system provides a direct connection to commission fees and schedules in an efficient manner.

The tax information 320 includes relevant federal and state tax law information in the U.S. and tax law information of foreign countries to the extent they are relevant to the initial asset portfolio 314 and the set of transactions 328 associated therewith. The tax information 320 may be stored as a set of tax rules, schedules, and associated tax computations, and may be manually or automatically provided.

The objectives 322 comprise the constraints that the genetic algorithm module 300 takes into consideration and attempts to optimize as it finds a solution for generating the asset disposition plan 328. Those objectives 322 include, but are not limited to, minimizing tax obligations, obtaining a target capital gain, maximizing the return on investment (ROI), avoiding sale of certain assets, minimizing associated commissions and fees, minimizing the number of transactions, preference to sell entire asset lots, consideration of future value, consideration of personal preference (regret), etc. Also, one of the objectives can be the generation of the desired amount of cash itself. In addition, each objective is associated with a weight that describes the level of importance of the objective. The weight may be fixed or it may be provided by the user. The weight is applied to one or more objective functions that relate to the particular objective. Any other relevant data 324 may be input as well, so long as it can be used to modify or adjust the operation of the objective functions, their input parameters, or the genetic algorithm module 300.

In one embodiment, the genetic algorithm module 300 comprises an initialization module 302, a scoring module 304, a selection module 306, a mating module 308, a mutation module 310, and a replacement module 312. The specific details of such software modules will be explained below in conjunction with FIG. 4. The genetic algorithm module 300 finds a solution for generating a desired amount of cash (one objective) from the initial asset portfolio 314 while satisfying the other objectives 322 and outputs a modified asset portfolio/cash 326 and an asset disposition plan 328 describing a set of transactions for obtaining such modified asset portfolio/cash 326 from the initial asset portfolio 314. The transactions of the asset disposition plan 328 specify each asset and the amount or percentage of that asset to be sold in order to generate the desired amount of cash while satisfying the other objectives 322. Disposition of the initial asset portfolio 314 in accordance with the set of specified transactions of the asset disposition plan 328 will result in the desired amount of cash (or the closet approximation thereto) and the modified asset portfolio 326 while optimizing the user's objectives.

Figure 4:
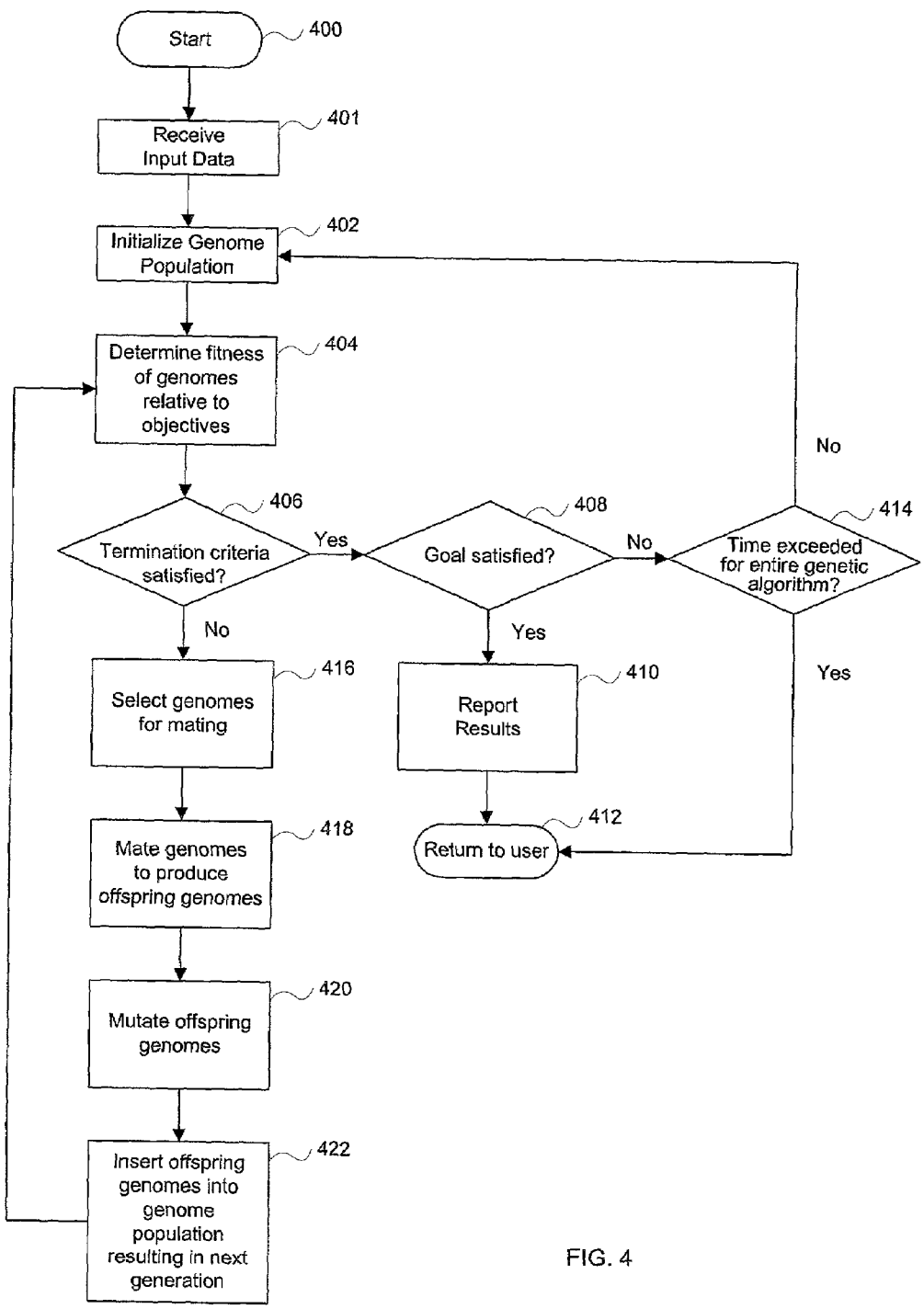
FIG. 4 is a flowchart illustrating the cash generating genetic algorithm of the present invention.

FIG. 4 is a flowchart illustrating the overall operation of cash the generating genetic algorithm module 300 of the present invention. Referring to FIG. 4 and also FIG. 3, the operation begins with the genetic algorithm module 300 receiving 401 input data such as the desired amount of cash to be generated from the asset disposition, the initial asset portfolio 314, asset valuation data 316, asset liquidation cost data 318, tax information 320, objectives and weights 322, and other relevant data 324.

More specifically, and depending on the embodiment, the module 300 reads the asset portfolio 314 from a database, such as a local database, or even a remote database, such as one maintained on the Internet by a financial services online provider. Again, depending on the implementation, the user interacts with the module 300 to designate the portfolio 314 from a number of other portfolios, or to construct the portfolio by selecting particular assets from a larger portfolio. For obtaining the asset valuation data 316, here too the module 300 reads from a database table or other local or remote source, and stores the information locally. For obtaining the objectives and their weights 322, the module 300 can provide the user with a graphical or textual user interface presenting each of the objectives and having the user rank order them in terms of importance, or use a sequence of pairwise comparisons to determine the user's implicit ranking, or provide the list of the objectives, along with a control for each to allow the user to set the weight (e.g., 1 to 10) of the objective, which are then internally normalized. In addition, the user can select which objectives 322 to satisfy and which to ignore (either by removing the objectives from the later computation process, or by giving such functions a weighting of 0). Input of the target amount of cash can likewise be made via a text or graphical user interface. If the user simply wants portfolio rebalancing without generation of any cash, then the user can weight the cash generation objective as zero (0). Asset liquidation cost data 318 and tax information 320 can also be obtained by reading a local database or a remote database.

Initialization of Genome Population

Then, a genome population is initialized 402 by the initialization module 300. The genome population comprises a plurality of genomes that are in the form of vectors. An initial genome population of around 100 genomes is useful, but more or fewer can be used. In the context of the present invention the terms "vector" and "genome" will be used interchangeably herein. Each genome comprises a plurality of 'alleles,' one allele for each asset in the initial asset portfolio 314. Each allele corresponds to an asset disposition value for each asset, representing how each asset should be disposed of.

According to one embodiment of the present invention, each allele represents a percentage of each asset to be sold. Assume, for example, that the initial asset portfolio 314 includes 4 different assets A, B, C, and D, each constituting 10%, 15%, 25%, and 50%, respectively, of the initial asset portfolio 314, in terms of their cash value, say $200, $300, $500, and $1,000 respectively in a portfolio having a total value of $2,000. For instance, a genome for this portfolio of <100, 20, 40, 50> has four alleles, 100, 20, 40, and 50, which means that 100% of asset A, 20% of asset B, 40% of asset C, and 50% of asset D need to be sold from the initial asset portfolio 314 to generate the desired amount of cash. That is, the allele of '100' indicates to sell 100% of asset A, i.e., 10% (100% of 10%, or $200) of the entire cash value of the asset portfolio. The allele of '20' indicates to sell 20% of asset B, 3% (20% of 15%, or $60) of the entire cash value of the portfolio, and so forth for the other alleles.

Alternatively, according to another embodiment of the present invention, each allele in the genome represents a percentage of each asset to keep rather than sell. In this case, in the above example, the genome <100, 20, 40, 50> indicates to keep 100% of asset A, 20% of asset B, 40% of asset C, and 50% of asset D, and sell the rest in order to generate the desired amount of cash and other objectives. Thus, the particular coding of the alleles (sell or keep) is merely a design consideration.

According to one embodiment, the genomes in the initial genome population are randomly generated. In one embodiment, each allele in a genome comprises a plurality of binary bits representing the asset disposition value. The genetic algorithm module 300 of the present invention utilizes a bit-string uniform procedure in randomly generating the genomes, by assigning 0 or 1 to each bit in the genome with equal probability. To this end, the genetic algorithm module 300 first chooses randomly a bit density d from a uniform distribution, wherein $0<=d<=1$. Then, the genetic algorithm module 300 randomly sets each bit of each allele to one (1) with a probability of d. This will result in genomes evenly distributed in the binary space. It should be noted that this initialization is with respect to the entire genome treated as single bit string, and temporarily ignoring the separation of the individual alleles. Thus, for example, if each allele is represented by a 32-bit value, and there are 10 alleles, then the genome is treated as 320 bit string during the initialization process. The values of each allele are then the values of each corresponding 32-bit word in the bit string.

Alternatively in accordance with another embodiment of the present invention, selected ones of the genomes in the initial genome population are initialized with predetermined values thereby giving structured data for the genetic algorithm module 300 to draw on. For example, including a genome of all zeros (0) and a genome of all ones (1) in the initial genome population will help the genetic algorithm module 300 to find solutions at the very ends of the solution space. Any number of other fixed genomes may be added to the initial population, though this is likely to affect the quality of the overall search of the solution space.

The alleles are preferably represented by either an unsigned integer or a floating-point number. If an unsigned integer is used according to one embodiment of the present invention, the integer represents the numerator of a quotient, the implicit denominator being the maximum unsigned integer that can be stored in a certain number of bits used by the computer. Therefore, the resultant quotient will be a rational number in the range of 0.0 to 1.0 in floating point form, which represents the asset disposition percentage for the corresponding asset. A very simple example will suffice: Assume that the maximum number of bits is 8, in which case the implicit denominator is 255 or "11111111" in binary form. Thus, for an allele that ultimately represents disposition of 64/255 (approximately 25%) of the asset, the numerator is 64 or "1000000" in binary form. As this should make clear then, the actual value stored for the allele in the vector does not necessarily have to be the asset disposition value, but only a value from which the asset disposition value can be calculated. In a preferred embodiment, alleles are represented by 32 bit unsigned integers. The use of unsigned integers as the alleles has an advantage that it helps avoiding epistasis, which is the inherent problem in genetic algorithms whereby a genome representation inhibits a genetic algorithm from finding an optimum solution to a problem.

Floating-point numbers may be used as the alleles according to another embodiment of the present invention. In this case the alleles will be a real floating-point number between 0 and 1 (including 0 and 1), and directly represent the asset disposition value. The use of real floating-point numbers as the alleles has an advantage that there is no need to convert each allele from its integer-numerator form to its floating-point form every time the allele is used in the genetic algorithm.

Determining Fitness of Genomes by Use of Objective Function

Thereafter, the fitness of the genomes in the genome population is determined 404 by the scoring module 304 to obtain a fitness score by using a composite objective function, respective objective functions and related objectives and weights 322. Determining the fitness of a genome is equivalent to determining how close the genome comes to optimizing or satisfying the user-specified objectives and weights 322 when the solution represented by the genome is applied to the initial asset portfolio 314. Again, the objectives themselves may include generating a target amount of cash from the asset portfolio.

According to one embodiment of the invention, the fitness scores of the genomes in the genome population are determined by (i) obtaining a composite genome objective value $O_{comp}$ for each genome in the genome population with an objective function that encompasses the objectives, and (ii) computing a fitness score F for each genome by applying a fitness function to the composite genome objective value $O_{comp}$ corresponding to each genome. The fitness function will be illustrated in detail below.

The composite genome objective value $O_{comp}$ for each genome in the genome population is calculated by first applying the evaluated genome to the initial asset portfolio 314 and using the respective objective functions, to compute the objective values $O_G$ for each underlying objective (amount of cash generated, tax, commission, etc.). That is, for each objective, there is an objective function to which the disposition of the assets defined in the genome is applied; the result of the each objective function is the objective value $O_G$. Then, the objective values $O_G$ from all of the functions are normalized and standardized to obtain a normalized, standardized objective value $O_i$ for each underlying objective. Finally, the normalized, standardized objective values $O_i$ are weighted and summed by a composite objective function to obtain a composite genome objective value $O_{comp}$ corresponding to the evaluated genome.

As illustrated in detail below, the objective values $O_G$ for each underlying objective can be calculated by applying the genome to the initial asset portfolio 314 to assess the impact of the transactions represented by the evaluated genome upon the various objectives. Each objective is associated with an objective value $O_G$. The best (optimum) and worst objective values $O_A$ and $O_Z$ corresponding to each underlying objective can also be calculated by analyzing the nature of the underlying objective.

Also as illustrated in detail below, the objective values $O_G$ for each underlying objective are normalized (a value between 0 and 1) and standardized (optimal value is 0, worst value is 1) to generate normalized, standardized objective values $O_i$. Normalization and standardization of the objective values allow the different values/scales of each objective value corresponding to different objectives (e.g., minimum tax and minimum commission) to be summed together, because they are now unitless relative values, not dollar values or other application-specific values any more.

The normalization and standardization of the objective values $O_G$ may be done in a different manner for different objectives by analyzing the nature of the objectives. For most objectives, the normalized, standardized objective value $O_i$ can be computed by dividing the difference between the calculated objective value $O_G$ and the best (or desired) objective value $O_A$ by a normalization factor, which for most underlying objectives is the difference between the worst objective value $O_Z$ and the best objective value $O_A$, i.e., by the formula $O_i = |O_G - O_A|/|O_A - O_Z|$. However, the normalization factor can be different from $|O_A - O_Z|$ depending upon the type of objective to be optimized.

The following is an illustration of the manner in which $O_G$, $O_A$, $O_Z$ and $O_i$ are computed for a given genome in the genome population for various objectives in accordance with one embodiment of the present invention. These objectives listed below are merely exemplary, and can include other objectives that are not listed herein.

Calculating the normalized, standardized objective value $O_i$ for the objective of optimizing the amount of cash generated: Here, $O_A$ is the desired amount of cash to be generated input by a user to the module 300 as one of the objectives 322, and $O_Z$ is the most possible cash that can be generated from the initial asset portfolio 314. This value $O_Z$ can be obtained by calculating the total value of all assets in the portfolio 314, since the value of the assets are already input to the module 300 as asset valuation data 318. $O_G$ is the sum of cash generated for each type of asset when the genome is applied (i.e., after the disposition of each asset according to the allele values). The cash generated for each asset can be obtained by multiplying the price per unit asset with the total number of units and the percentage of the asset to be sold as represented by each allele of the genome. The price per unit is included in the asset valuation data 316, and the total number of units is included in the initial asset portfolio 314. The normalized, standardized objective value $O_i = |O_A - O_G|/|O_A|$, when $O_A >= O_Z/2$ and $O_i = |O_A - O_G|/|O_A - O_Z|$, when $O_A < O_Z/2$. Here, different normalization factors are needed to take into consideration two different circumstances. When $O_A$ is closer to $O_Z$, the normalization factor is $|O_A|$. When $O_A$ is closer to 0, the normalization factor is $|O_A-O_Z|$. This is done so that the normalized, standardized objective values will always be in the range of 0 to 1.

Calculating the normalized, standardized objective value $O_i$ for the underlying objective of maximizing capital gain: Here, $O_A$ is the sum of the capital gains from all assets which when sold would generate a gain, without considering taxes, commission, etc. $O_Z$ is the sum of capital loss from all assets which when sold would generate a loss, without considering taxes, commission, etc. These values $O_A$ and $O_Z$ can be calculated by using the initial asset portfolio 314 and asset valuation data 316 input to the module 300. A capital gain is generated when the current value is higher than the basis for the asset and a capital loss is generated when the current value is lower than the basis for the asset. The current value of the assets is part of the asset valuation data and the basis is included in the initial asset portfolio data 314. $O_G$ is the total capital gain generated from the asset portfolio 314 when the evaluated genome is applied to the portfolio 314. Each allele in the evaluated genome is applied to each asset, and generates a capital gain if the current sales price exceeds the basis and a capital loss if the current sales price is lower than the basis. Summation of all the capital gains and capital losses for the assets results in the total generated capital gain $O_G$. The normalized, standardized objective value $O_i=|O_A-O_G|/|O_A-O_Z|$.

Calculating the normalized, standardized objective value $O_i$ for the objective of minimizing tax: Here, $O_A$ is the loss limit (typically a minus value) permitted under the tax law, and $O_Z$ is the maximum tax incurred when all assets showing a capital gain are sold, calculated by applying the appropriate tax law to the maximum capital gain. As explained previously, the appropriate tax law is input to the module as tax information 320. The loss limit is included in the tax information 320. $O_G$ is obtained by applying the appropriate tax law to the results of the change in the asset portfolio when the genome is applied to the asset portfolio 314. The tax calculation can also be done by finance management applications such as Intuit Inc.'s QUICKEN® or Microsoft Corp.'s MONEY®. The normalized, standardized objective value $O_i=|O_A-O_G|/|O_A-O_Z|$.

Calculating the normalized, standardized objective value $O_i$ for the objective of minimizing the commission (costs) for the transactions: Here, $O_A$ is \$0 (no commission), and $O_Z$ is the sum total of commissions (costs) incurred by selling 100% of all the assets, calculated by adding the appropriate commissions for selling all the assets. $O_G$ is obtained by adding the appropriate commissions (costs) for the results of the change in the asset portfolio when the genome is applied to the asset portfolio 314. As explained previously, information on the appropriate commissions is input to the module 300 as asset liquidation cost data 318. The normalized, standardized objective value $O_i=O_A-O_G|/|O_A-O_Z|$.

Calculating the normalized, standardized objective value $O_i$ for the objective of minimizing the total number of transactions: Here, $O_A$ is 0, and $O_Z$ is the total number of assets in the asset portfolio 314. $O_G$ is the number of transactions represented by the genome to be evaluated, which can be calculated by counting the number of alleles that represent a sale of asset in the asset portfolio 314. When the alleles represent the percentage to sell, then any non-zero allele represents a sale of asset in the asset portfolio 314. The normalized, standardized objective value $O_i=|O_A-O_G|/|O_A-O_Z|$.

Calculating the normalized, standardized objective value $O_i$ for the objective of favoring sale by whole lots: Here, $O_A$ is 1 (i.e., the average percentage of the asset lots being sold is 1.0 or 100%), and $O_Z$ is 0 (i.e., the average percentage of the asset lots being sold is 0.0 or 0%). $O_G$ is the average percentage of the asset lots being sold when the evaluated genome is applied to the asset portfolio, and can be obtained by averaging the percentages of the assets to be sold represented by each allele in the evaluated genome. The normalized, standardized objective value $O_i=|O_A-O_G|/|O_A-O_Z|$.

Calculating the normalized, standardized objective value $O_i$ for the objective of minimizing regret value: Regret value is a user-specified value assigned to each asset in the asset portfolio 314 and represents a degree of dislike for selling a particular asset. According to one embodiment of the present invention, the higher the regret value for a particular asset is, the more disfavored the sale of that asset is, that is the more the user desires to keep the asset. Regret values can be input to the module 300 as one of the objectives 322, and are in the range of 0 to 1. $O_A$ is 0 (no regret) and $O_Z$ is 1 (total regret, most disfavored sale). $O_G$ is the average regret value for all the assets when the evaluated genome is applied to the asset portfolio 314. $O_G$ is calculated by (i) adding all the regret values assigned to assets that should be sold according to the evaluated genome (i.e., alleles represent a sale of the asset) to obtain a total regret value and (ii) dividing the total regret value by the number of assets in the portfolio. The normalized, standardized objective value $O_i=|O_A-O_G|/|O_A-O_Z|$.

Calculating the normalized, standardized objective value $O_i$ for the objective of obtaining a target capital gain: Here, two additional variables are introduced, $O_{MIN}$ and $O_{MAX}$. $O_{MIN}$ is the sum of capital loss from all assets which when sold would generate loss, and $O_{MAX}$ is the sum of capital gain from all assets which when sold would generate a gain. These values $O_{MIN}$ and $O_{MAX}$ can be calculated by using the initial asset portfolio 314 and asset valuation data 316 input to the module 300. $O_A$ (optimum value) is the target amount of capital gain specified by a user, as one of the objectives 322. $O_G$ is the total capital gain generated from the asset portfolio 314 when the evaluated genome is applied to the portfolio 314. Each allele in the evaluated genome is applied to its corresponding asset, and generates a capital gain if the current sales price exceeds the basis and a capital loss if the current sales price is lower than the basis. Summation of all the capital gains and capital losses for the assets results in the total generated capital gain $O_G$. The normalized, standardized objective value $O_i=|O_A-O_G|/|O_{MIN}-O_{MAX}|$.

Calculating the normalized, standardized objective value $O_i$ for the objective of maximizing return on investment (ROI): Here, $O_A$ is the sum of the ROI of all assets of which the ROI is greater than or equal to 0, and $O_Z$ is the sum of the ROI of all assets of which the ROI is less than 0. ROI for each asset can be calculated by dividing the difference between the sales proceeds and the basis of the asset by the basis. The sale proceeds of the assets are obtained from the asset valuation data 316 input to the module 300, and the basis is obtained from the initial asset portfolio 314 input to the module 300. $O_G$ is the ROI of the asset portfolio 314 when the evaluated genome is applied to the portfolio 314. Each allele in the evaluated genome is applied to its corresponding asset and generates a sales proceed and thus an ROI. $O_G$ can be obtained by adding up the ROI of all assets when the alleles of the evaluated genome are applied to the assets in the portfolio 314. The normalized, standardized objective value $O_i=|O_A-O_G|/|O_A-O_Z|$.

After the standardized, normalized objective values for the respective underlying objectives are calculated for the evaluated genome, the composite genome objective value $O_{comp}$ for the evaluated genome can be obtained by the following composite objective function:

$$O_{comp} = \sum_{i=1}^{n} w_i O_i$$

where $O_i$ is the normalized, standardized objective value for each objective;

$w_i$ is a weight for each objective; and n is the number of objectives to be optimized.

The weights are importance levels (either predetermined or specified by the users) in the range of 0 to 1 and are normalized so that they add up to 1. Each weight corresponds to each objective. Since the $O_i$'s are normalized and standardized values, a composite genome objective value $O_{comp}$ of zero (0) is the best (optimum) value and one (1) is the worst value.

In the manner described above, the composite genome objective values $O_{comp}$'s corresponding to all the genomes in the genome population are determined. Thereafter, the fitness score F for each genome in the genome population is obtained by applying a fitness function to each composite genome objective value $O_{comp}$ corresponding to each genome in the genome population. The fitness function is applied to the composite genome objective values in order to redistribute the genomes in the solution space such that the genomes are distributed in a way more effective for the genetic algorithm. According to one embodiment of the present invention, the fitness score F for each genome in the genome population can be obtained by sigma truncation:

$$F = O_{comp} - (O_{average} - c*O_\sigma)$$

where $O_{comp}$ is the composite genome objective value for the genome;

$O_{average}$ is the average of the composite genome objective values $O_{comp}$'s corresponding to all of the genomes in the genome population;

c is a constant, preferably equal to 2 (two) according to one embodiment of the present invention; and $O_\sigma$ is the standard deviation of the composite genome objective values $O_{comp}$'s corresponding to all of the genomes in the genome population.

In this manner, the fitness scores F of all the genomes in the genome population can be determined. The fitness scores F of all the genomes are also in the range of 0 to 1.

Termination Criteria

After the fitness scores of all the genomes in the genome population is calculated, it is determined 406 whether or not the termination criteria are satisfied. The termination criteria is one of two circumstances:

(i) at least one of the genomes in the genome population represents an asset disposition plan for assets in the initial asset portfolio 314 such that the disposition of each asset in accordance with the alleles in the genome most nearly optimizes the objectives 322 (including generation of target amount of cash); or (ii) the number of generations for modifying the genome population has exceeded a certain limit applicable to modifying one genome population.

The user of the module 300 can specify how nearly the objectives should be optimized by the asset disposition plan 328 represented by the genomes. For example, the user can specify a threshold amount for the amount of cash generated, and when the cash generated by the genome exceeds the threshold amount, then the termination criterion is satisfied. Likewise, the user can specify a threshold fitness score, and when the fitness score of at least one of the genomes in the genome population is lower than the threshold fitness score, the termination criterion is satisfied.

The number of generations limit for one genome population as the termination criteria is preferably set as 50, such that the genetic algorithm terminates when the number of generations of one genome population exceeds 50. According to another embodiment of the present invention, another termination condition is added to the number of generations. That is, when the number of generations exceeds 50, then it is determined whether or not the ratio of the best fitness score in the first generation to the best fitness score in the current generation is smaller than one (1). If the ratio is smaller than or equal to one (1), then the genetic algorithm is terminated because this means that the fitness score is not getting better (i.e., not getting lower) for further generations. If the ratio is larger than one (1), then the genetic algorithm is not terminated because this means that the fitness score is getting better (i.e., getting lower) for further generations and it is worth trying the subsequent generations to find an optimum solution.

If one of the termination criteria is satisfied 406, the results are reported 410 and the process is returned 412 to the user, when the genetic algorithm module 300 has satisfied 408 the goal of optimizing the objectives (including generating the desired amount of cash). If the goal is not satisfied 408, then it is determined 414 whether or not the execution time applicable to the entire genetic algorithm of the application has exceeded a certain limit. If so, then the process is returned 412 to the user with the current best results. If not, the process returns to initialize 402 the genome population again and restarts the genetic algorithm. According to one embodiment, a user imposes this time limit for the entire genetic algorithm of the application. In another embodiment, this time limit is predetermined in the genetic algorithm module 300 itself.

Selection of Genomes for Mating

If the termination criteria are not satisfied 406, the selection module 306 in the genetic algorithm module 300 proceeds to select 416 genomes for mating. The selection can be carried out by roulette wheel selection, tournament selection, or any other type of selection method typically used by genetic algorithms.

According to one embodiment of the present invention, roulette wheel selection is used to give every genome in the genome population a chance of mating, the chance of mating for each genome being proportional to the determined fitness score of each genome. To this end, the fitness score $F_j$ for $genome_j$ is used as a threshold and a random number R in the range of 0 to 1 is selected. According to one embodiment of the present invention where the fitness scores are standardized such that the best value is 0, the genome is selected for mating if $R > F_j$. Otherwise the genome is skipped. Because very good genomes will have very low $F_j$'s, R will more likely be greater than their fitness $F_j$. Very poor genomes are less likely to be picked. Roulette wheel selection is continued until the genetic algorithm module has selected two mating genomes from the genome population.

According to another embodiment of the present invention, tournament selection is used for selecting the mating genomes. Specifically, a first superior genome is selected from a first set of two randomly chosen genomes in the initial genome population. Then, a second superior genome is additionally selected from a second set of two randomly chosen genomes in the initial genome population. The first and second superior genomes are the selected genomes for mating. Superiority of each genome is determined based on the fitness score for each genome computed above. Tournament selection is continued until the genetic algorithm module has selected two mating genomes from the genome population.

Mating Genomes to Create Offspring Genomes

Thereafter, the two selected genomes are mated 418 by the mating module 308 to create offspring genomes. According to one embodiment of the present invention, the selected genomes are mated by single-point crossover. Single-point crossover is performed by randomly selecting a common crossover point (bit) in a first mating genome and a second mating genome among the selected mating genomes. The first mating genome has a first portion and a second portion divided by the common crossover point and the second mating genome also has a first portion and a second portion divided by the common crossover point. Then, the second portion of the first mating genome is replaced with the second portion of the second mating genome to create an offspring genome.

In accordance with another embodiment of the present invention, two-point crossover is used for mating. Two-point crossover is performed by selecting two crossover points (here, bit positions in the genome), copying the part from the beginning of the genome to the first crossover point from the first mating genome, copying the part from the first to the second crossover point from the second mating genome, and copying the part from the second crossover point to the end of the genome from the first mating genome, so as to create an offspring genome.

In accordance with still another embodiment of the present invention, uniform crossover is used for mating. Uniform crossover is performed by randomly copying from either the first mating genome or the second mating genome to create an offspring genome. That is, the length of the genome is traversed and at each bit location a bit is copied into the offspring genome from either the first mating genome or the second mating genome.

According to still another embodiment of the present invention, arithmetic crossover is used for mating. Arithmetic crossover is carried out by performing some arithmetic operation with the first and second mating genomes to create an offspring genome. For example, the first and second mating genomes represented by binary bits are added to obtain the offspring genome.

Mutating Offspring Genomes

Thereafter, the offspring genomes are mutated 420 at a low frequency by the mutation module 310. According to one embodiment of the present invention, the mutation rate is 0.01%, and this is implemented by selecting a single integer in the range of 1 to 10,000, and mutating only when a randomly selected number in the range equals the selected integer. Another approach is to set the mutation rate as the threshold itself, and mutate the bit only if a randomly selected number is below the threshold. The low frequency mutation rate is selected such that it is high enough for the genetic algorithm to explore the solution space effectively but low enough to prevent destruction of information obtained during mating. Mutation is carried out by (i) selecting a bit in the offspring genome to mutate by random selection in a uniform distribution, and (ii) changing the selected bit in the offspring genome from zero (0) to one (1), or vice versa.

Inserting Offspring Genomes into Genome Population

Thereafter, the offspring genomes are inserted 422 into the genome population and a new generation genome population is obtained based on a replacement strategy by the replacement module 312. According to one embodiment of the present invention, the replacement strategy adds the offspring genome to the initial genome population to obtain a modified genome population. Then, the fitness score of each genome in the modified genome population is determined in the manner described above. Thereafter, a first predetermined number of the worst vectors are removed from the modified genome population based upon the determined fitness of the modified genome population. Finally, a second predetermined number of the best vectors in the initial genome population are added to the modified genome population based upon the determined fitness of the initial genome population. The resultant modified genome population is the new (next generation) genome population. According to one embodiment of the present invention, the first and second predetermined numbers above are 25.

Then, the process returns to determine 404 the fitness of the new genome population as described above. The processes 404, 406, 416, 418, 420, and 422 are repeated until the termination criteria are satisfied 406.

The genetic algorithm module 300 is able to search an enormous, non-linear search space with a number of interdependent variables to find a near optimal solution for optimizing or satisfying numerous objectives specified by the user. Numerous (possibly conflicting) objectives can be weighted by the importance levels and optimized at the same time. The objectives can include generating a target amount of cash. Moreover, the genetic algorithm module 300 is not limited to a certain type of asset and can be used with any type of assets in an asset portfolio. In addition, the solution can be found in an acceptable period of time, such as a few seconds to a few minutes.

Computer software implementation of the cash generating genetic algorithm can be readily done, since it is programmable in any type of programming language that can run on any type of computer.

Although the present invention has been illustrated as a computer-implemented method, it should be clear to one skilled in the art that the genetic algorithm module 300 of the present invention can be embodied in a computer program product recorded on any type of computer readable medium.

It is also possible to use multiple different genome populations as the initial genome populations and run them simultaneously according to the genetic algorithm, rather than use one initial genome population. For example, one embodiment of the present invention utilizes 10 genome populations in parallel. This would result in reduction of the time required for finding the solution but would also be a heavier computational burden on the computer that runs the genetic algorithm.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMS), random access memories (RAMS), EPROMs, EEPROMs, magnetic or optical cards, application specific integrated circuits (ASICs), each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer-implemented method of determining an asset disposition plan for an asset portfolio comprising:

obtaining a genome population having a first set of vectors, each vector in the first set of vectors representing a change in a percentage of each asset in the asset portfolio containing a number of assets;

obtaining a plurality of objectives with respect to the asset disposition plan, the plurality of objectives including generation of a cash amount and each objective of the plurality of objectives associated with a weight indicating the importance of the objective;

computing a fitness score by applying a fitness function to each vector of a plurality of vectors in the genome population using an objective value, the objective value determined by applying an objective function to the vector, the objective value weighted by the corresponding weight, wherein the fitness function comprises a function $F = O_{comp} - (O_{average} - 2 \cdot O_\sigma)$, wherein F is the fitness score corresponding to each vector, wherein $O_{comp}$ is a composite objective value corresponding to each vector, wherein $O_{average}$ is an average of composite objective values corresponding to the first set of vectors in the genome population, and wherein $O_\sigma$ is a standard deviation of the composite objective values corresponding to the first set of vectors in the genome population; and introducing a new set of vectors in the genome population derived from the plurality of vectors including the first set of vectors, until a termination criteria is satisfied and at least one of the vectors of the plurality of vectors in the genome population represents the asset disposition plan, such that the disposition of each asset is in accordance with the asset disposition plan where the objectives are optimized, by:

selecting mating vectors from the first set of vectors based on the fitness score of each of the first set of vectors;

mating the selected mating vectors by uniform crossover to obtain a second set of vectors;

mutating the second set of vectors, by selecting a second plurality of vectors from the second set of vectors in a uniform distribution, and modifying the second plurality of vectors to obtain a third set of vectors;

replacing selected ones of vectors in the first set of vectors in the genome population with the third set of vectors, by:

adding the third set of vectors to the first set of vectors to obtain a modified first set of vectors;

determining the fitness score of each vector in the modified first set of vectors to obtain determined fitness scores;

removing a first predetermined number of the worst vectors from the modified first set of vectors based upon the determined fitness scores of the modified first set of vectors; and adding a second predetermined number of best vectors in the first set of vectors to the modified first set of vectors based upon fitness scores of the first set of vectors to generate a result comprising a plurality of result vectors;

determining that the termination criteria is satisfied, wherein the termination criteria comprises a threshold amount for the cash amount generated and a threshold fitness score, wherein the termination criteria is satisfied when the cash amount generated exceeds the threshold amount, and wherein the termination criteria is satisfied when the fitness score of at least one of the plurality of result vectors is lower than the threshold fitness score.

2. The computer-implemented method of claim 1, wherein obtaining the genome population having the first set of vectors comprises generating the first set of vectors by random selection of numerical values representing the disposition of each asset in the asset portfolio.

3. The computer-implemented method of claim 1, wherein each vector in the first set of vectors comprises a plurality of alleles each including a plurality of bits, and obtaining the genome population having the first set of vectors comprises:
  randomly choosing a bit density d from a uniform distribution, wherein $0 <= d <= 1$; and
  in each of the first set of vectors, randomly setting each bit of each allele to one with a probability of d.

4. The computer-implemented method of claim 1, wherein each vector of the plurality of vectors in the genome population includes a plurality of alleles, each allele corresponding to an asset in the asset portfolio and indicating a percentage of the asset that should be sold as part of the asset disposition plan.

5. The computer-implemented method of claim 1, wherein each vector of the plurality of vectors in the genome population includes a plurality of alleles, each allele corresponding to an asset in the asset portfolio and indicating a percentage of the asset that should be kept as part of the asset disposition plan.

6. The computer-implemented method of claim 1, wherein the mating vectors are selected by roulette wheel selection.

7. The computer-implemented method of claim 1, wherein the mating vectors are selected by tournament selection.

8. The computer-implemented method of claim 1, wherein computing the fitness score for each vector of the plurality of vectors comprises:
  obtaining objective values $O_G$ corresponding to associated objectives, each objective value representing a degree to which an associated objective is optimized when each asset is disposed in accordance with the asset disposition plan represented by each vector;
  normalizing and standardizing each of the objective values $O_G$ to obtain normalized, standardized objective values $O_i$ corresponding to each of the objectives;
  obtaining the composite objective value $O_{comp}$ corresponding to the vector by the following equation:

$$O_{comp} = \sum_{i=1}^{n} w_i O_i$$

wherein $O_{comp}$ is the composite objective value corresponding to each vector,
  wherein $O_i$ is the normalized, standardized objective value corresponding to each of the objectives,
  wherein $w_i$ is the weight corresponding to each objective, and
  wherein n is the number of objectives; and
  applying the fitness function to the composite objective value $O_{comp}$ to obtain the fitness score corresponding to the vector.

9. The computer-implemented method of claim 8, wherein the weight is a user-specified value.

10. The computer-implemented method of claim 8, wherein the weights add up to one.

11. The computer-implemented method of claim 8, wherein the normalized, standardized objective value $O_i$ corresponding to each objective is obtained by dividing a difference between the objective value $O_G$ and an optimum objective value with a normalizing factor.

12. The computer-implemented method of claim 11, wherein the normalizing factor is a difference between the optimum objective value and a worst objective value.

13. The computer-implemented method of claim 8, wherein the associated objectives comprise optimizing the amount of cash generated, and the normalized, standardized objective value $O_i$ for the objective of optimizing the amount of cash generated is obtained by:

$$O_i = |O_A - O_G|/|O_A|, \text{ when } O_A >= O_Z/2; \text{ and}$$

$$O_i = |O_A - O_G|/|O_A - O_Z|, \text{ when } O_A < O_Z/2,$$

where $O_A$ is a desired amount of cash to be generated from the asset portfolio;
  $O_Z$ is a maximum amount of cash that can be generated from the asset portfolio; and
  $O_G$ is total cash generated when each asset in the asset portfolio is disposed of in accordance with the asset disposition plan represented by the vector.

14. The computer-implemented method of claim 8, wherein the associated objectives comprise maximizing capital gain, and the normalized, standardized objective value $O_i$ for the objective of maximizing capital gain is obtained by:

$$O_i = |O_A - O_G|/|O_A - O_Z|,$$

where $O_A$ is a maximum capital gain that can be generated from the asset portfolio;
  $O_Z$ is a maximum capital loss that can be generated from the asset portfolio; and
  $O_G$ is total capital gain generated when each asset in the asset portfolio is disposed of in accordance with the asset disposition plan represented by the vector.

15. The computer-implemented method of claim 8, wherein the associated objectives comprise minimizing tax, and
  the normalized, standardized objective value $O_i$ for the objective of minimizing tax is obtained by:

$$O_i = |O_A - O_G|/|O_A - O_Z|,$$

where $O_A$ is a loss limit permitted by tax law;
  $O_Z$ is a maximum tax incurred when all assets showing a capital gain are sold from the asset portfolio; and
  $O_G$ is total tax incurred when each asset in the asset portfolio is disposed of in accordance with the asset disposition plan represented by the vector.

16. The computer-implemented method of claim 8, wherein the associated objectives comprise minimizing costs for transactions, and the normalized, standardized objective value $O_i$ for the objective of minimizing costs for transactions is obtained by:

$$O_i = |O_A - O_G|/|O_A - O_Z|,$$

where $O_A$ is 0;
  $O_Z$ is total costs incurred by disposing of all assets in the asset portfolio; and
  $O_G$ is costs incurred when each asset in the asset portfolio is disposed of in accordance with the asset disposition plan represented by the vector.

17. The computer-implemented method of claim 8, wherein the associated objectives comprise minimizing the total number of transactions, and the normalized, standardized objective value $O_i$ for the objective of minimizing the total number of transactions is obtained by:

$$O_i = |O_A - O_G|/|O_A - O_Z|,$$

where $O_A$ is 0;
$O_Z$ is the total number of assets in the asset portfolio; and
$O_G$ is the number of transactions required by the asset disposition plan represented by the vector.

18. The computer-implemented method of claim 8, wherein the associated objectives comprise favoring sale by whole asset lots, and the normalized, standardized objective value $O_i$ for the objective of favoring sale by whole asset lots is obtained by:

$$O_i = |O_A - O_G|/|O_A - O_Z|,$$

where $O_A$ is 1;
$O_Z$ is 0; and
$O_G$ is the average percentage of the asset lots being disposed of in accordance with the asset disposition plan represented by the vector.

19. The computer-implemented method of claim 8, wherein the associated objectives comprise minimizing regret value, and the normalized, standardized objective value $O_i$ for the objective of minimizing regret value is obtained by:

$$O_i = |O_A - O_G|/|O_A - O_Z|,$$

where $O_A$ is 0;
$O_Z$ is 1; and
$O_G$ is the average regret value when each asset in the asset portfolio is disposed of in accordance with the asset disposition plan represented by the vector.

20. The computer-implemented method of claim 8, wherein the associated objectives comprise obtaining a target capital gain, and the normalized, standardized objective value $O_i$ for the objective of obtaining the target capital gain is obtained by:

$$O_i = |O_A - O_G|/|O_{MIN} - O_{MAX}|,$$

where $O_{MIN}$ is the sum of capital loss from all assets in the asset portfolio;
$O_{MAX}$ is the sum of capital gain from all assets in the asset portfolio;
$O_A$ is the target capital gain; and
$O_G$ is total capital gain generated when each asset in the asset portfolio is disposed of in accordance with the asset disposition plan represented by the vector.

21. The computer-implemented method of claim 8, wherein the associated objectives comprise maximizing return on investment, and the normalized, standardized objective value $O_i$ for the objective of maximizing return on investment is obtained by:

$$O_i = |O_A - O_G|/|O_A - O_Z|,$$

where $O_A$ is the sum of the return on investment of all assets of which the return on investment is greater than or equal to 0;
$O_Z$ is the sum of the return on investment of all assets of which the return on investment is less than 0; and
$O_G$ is the return on investment when each asset in the asset portfolio is disposed of in accordance with the asset disposition plan represented by the vector.

22. The computer-implemented method of claim 1, wherein the weight corresponding to an objective of generation of the cash amount is 0, wherein the objective is one of the plurality of objectives.

23. A computer readable storage medium storing instructions to determine an asset disposition plan for an asset portfolio, the instructions executable on a processor and comprising functionality to:
obtain a genome population having a first set of vectors, each vector in the first set of vectors representing a change in a percentage of each asset in the asset portfolio containing a number of assets;
obtain a plurality of objectives with respect to the asset disposition plan, the plurality of objectives including generation of a cash amount and each objective of the plurality of objectives associated with a weight indicating the importance of the objective;
compute a fitness score by applying a fitness function to each vector of a plurality of vectors in the genome population using an objective value, the objective value determined by applying an objective function to the vector and weighted by the corresponding weights,
  wherein the fitness function comprises a function $F = O_{comp} - (O_{average} - 2 \cdot O_\sigma)$,
  wherein F is the fitness score corresponding to each vector,
  wherein $O_{comp}$ is a composite objective value corresponding to each vector,
  wherein $O_{average}$ is an average of composite objective values corresponding to the first set of vectors in the genome population, and
  wherein $O_\sigma$ is a standard deviation of the composite objective values corresponding to the first set of vectors in the genome population;
introduce a new set of vectors in the genome population derived from the plurality of vectors including the first set of vectors, until a termination criteria is satisfied and at least one of the vectors of the plurality of vectors in the genome population represents the asset disposition plan, such that the disposition of each asset is in accordance with the asset disposition plan where the objectives are optimized, by:
  selecting mating vectors from the first set of vectors based on the fitness score of each of the first set of vectors;
  mating the selected mating vectors by uniform crossover to obtain a second set of vectors;
  mutating the second set of vectors, by selecting a second plurality of vectors from the second set of vectors in a uniform distribution and modifying the second plurality of vectors to obtain a third set of vectors; and
  replacing selected ones of vectors in the first set of vectors in the genome population with the third set of vectors, by:
    adding the third set of vectors to the first set of vectors to obtain a modified first set of vectors;
    determining the fitness score of each vector in the modified first set of vectors to obtain determined fitness scores;
    removing a first predetermined number of the worst vectors from the modified first set of vectors based upon the determined fitness scores of the modified first set of vectors; and
    adding a second predetermined number of best vectors in the first set of vectors to the modified first set of vectors based upon fitness scores of the first set of vectors to generate a result comprising a plurality of result vectors;
determine that the termination criteria is satisfied, wherein the termination criteria comprises a threshold amount for the cash amount generated and a threshold fitness score, wherein the termination criteria is satisfied when the cash amount generated exceeds the threshold amount, and wherein the termination criteria is satisfied when the fitness score of at least one of the plurality of result vectors is lower than the threshold fitness score.

24. The computer readable storage medium of claim 23, wherein computing the fitness score for each vector comprises:

obtaining objective values $O_G$ corresponding to associated objectives, each objective value representing a degree to which the associated objective is optimized when each asset is disposed in accordance with an asset disposition plan represented by the vector;

normalizing and standardizing each of the objective values $O_G$ to obtain normalized, standardized objective values $O_i$ corresponding to each of the objectives;

obtaining the composite objective value $O_{comp}$ corresponding to the vector by the following equation:

$$O_{comp} = \sum_{i=1}^{n} w_i O_i$$

wherein $O_{comp}$ is the composite objective value corresponding to the vector, wherein $O_i$ is the normalized, standardized objective value corresponding to each of the objectives, wherein $w_i$ is the weight corresponding to each objective, and wherein n is the number of objectives; and applying the fitness function to the composite objective value $O_{comp}$ to obtain the fitness score corresponding to the vector.

25. A computer system for determining an asset disposition plan for an asset portfolio comprising:

an initialization module configured to:
obtain a genome population having a first set of vectors, each vector in the first set of vectors representing a change in a percentage of each asset in the asset portfolio containing a number of assets;

a scoring module configured to:
compute a fitness score by applying a fitness function to each vector of a plurality of vectors in the genome population using an objective value, the objective value associated with a plurality of objectives and weighted by a corresponding weight indicating the importance of the objective,
wherein the fitness function comprises a function $F = O_{comp} - (O_{average} - 2 \cdot O_{94})$,
wherein F is the fitness score corresponding to each vector,
wherein $O_{comp}$ is a composite objective value corresponding to each vector,
wherein $O_{average}$ is an average of composite objective values corresponding to the first set of vectors in the genome population, and wherein $O_\sigma$ is a standard deviation of the composite objective values corresponding to the first set of vectors in the genome population;

a selection module configured to:
select mating vectors from the first set of vectors based on the fitness score of each of the first set of vectors;

a mating module configured to:
mate the selected mating vectors by uniform crossover to obtain a second set of vectors;

a mutation module configured to:
mutate the second set of vectors, by selecting a plurality of vectors from the second set of vectors in a uniform distribution and modifying the plurality of vectors to obtain a third set of vectors;

a replacement module configured to:
replace selected ones of vectors in the first set of vectors in the genome population with the third set of vectors, by:
adding the third set of vectors to the first set of vectors to obtain a modified first set of vectors;
determining the fitness score of each vector in the modified first set of vectors to obtain determined fitness scores;
removing a first predetermined number of the worst vectors from the modified first set of vectors based upon the determined fitness scores of the modified first set of vectors; and
adding a second predetermined number of best vectors in the first set of vectors to the modified first set of vectors based upon fitness scores of the first set of vectors to generate a result comprising a plurality of result vectors; and a genetic algorithm module configured to:
introduce a new set of vectors in the genome population derived from the plurality of vectors including the first set of vectors, until a termination criteria is satisfied and at least one of the vectors of the plurality of vectors in the genome population represents the asset disposition plan, such that the disposition of each asset is in accordance with the asset disposition plan where the objectives are optimized;
determine that the termination criteria is satisfied, wherein the termination criteria comprises a threshold amount for a cash amount generated and a threshold fitness score, wherein the termination criteria is satisfied when the cash amount generated exceeds the threshold amount, and wherein the termination criteria is satisfied when the fitness score of at least one of the plurality of result vectors is lower than the threshold fitness score.

26. The computer system of claim 25, wherein the weight corresponding to an objective of generation of the cash amount is 0, wherein the objective is one of the plurality of objectives.

* * * * *

UNITED STATES PATENT AND TRADEMARK OFFICE
CERTIFICATE OF CORRECTION

PATENT NO. : 7,680,747 B2 Page 1 of 1
APPLICATION NO. : 10/099043
DATED : March 16, 2010
INVENTOR(S) : Kenneth W. Hilton It is certified that error appears in the above-identified patent and that said Letters Patent is hereby corrected as shown below:

In Claim 23, Column 20 (line 20), please replace "$O_{94}$" with -- $\mathbf{O_\sigma}$ --.

In Claim 25, Column 21 (line 50), please replace "$O_{94}$" with -- $\mathbf{O_\sigma}$ --.

Signed and Sealed this

Twenty-second Day of June, 2010

David J. Kappos
*Director of the United States Patent and Trademark Office*